United States Patent
Chuang et al.

(10) Patent No.: US 6,961,947 B2
(45) Date of Patent: Nov. 1, 2005

(54) APPARATUS FOR REDUCING RUNNING NOISE IN DISK DRIVE

(75) Inventors: Cheng-Chieh Chuang, Sanchung (TW); Chiu-An Huang, Yunlin (TW); Yi-Ling Lee, Jungli (TW)

(73) Assignee: Benq Corporation, Taoyuan (TW)

( * ) Notice: Subject to any disclaimer, the term of this patent is extended or adjusted under 35 U.S.C. 154(b) by 304 days.

(21) Appl. No.: 10/339,803

(22) Filed: Jan. 10, 2003

(65) Prior Publication Data

US 2003/0133390 A1 Jul. 17, 2003

(30) Foreign Application Priority Data

Jan. 15, 2002 (TW) ........................................ 91100485 A

(51) Int. Cl.[7] .............................................. G11B 33/14
(52) U.S. Cl. ........................................................ 720/611
(58) Field of Search ................................ 720/611, 651; 369/77.1, 77.2, 75.1, 75.2

(56) References Cited

U.S. PATENT DOCUMENTS

| | | | | |
|---|---|---|---|---|
| 6,002,658 A | * | 12/1999 | Aso et al. ................... | 720/651 |
| 6,317,402 B1 | * | 11/2001 | Huang et al. ................ | 720/603 |
| 6,392,976 B1 | * | 5/2002 | Lin ............................. | 720/611 |
| 6,493,310 B1 | * | 12/2002 | Kim et al. ................... | 720/611 |
| 6,826,768 B2 | * | 11/2004 | Wu et al. .................... | 720/651 |

FOREIGN PATENT DOCUMENTS

| | | |
|---|---|---|
| CN | 2401966 Y | 10/2000 |
| JP | 63-113793 | 11/1989 |

* cited by examiner

Primary Examiner—A. J. Heinz
Assistant Examiner—Mark Blouin
(74) Attorney, Agent, or Firm—Snell & Wilmer L.L.P.

(57) ABSTRACT

When a disk drive is running, airflow is generated in the disk drive. The disk drive includes a tray and a housing. A plurality of through-holes are disposed on the tray, and the housing accommodates the tray therein. While airflow flows over the through-hole, noise is generated. Walls are formed on the rim of the through-hole to reduce this noise. A sponge for absorbing noise is adhered on the inner top portion of the housing for absorbing noise. As holes are located on the front end of the tray for guiding airflow, noise is reduced to a lower level.

12 Claims, 9 Drawing Sheets

APPARATUS FOR REDUCING RUNNING NOISE IN DISK DRIVE

This application claims priority of Taiwan Patent Application Serial No. 91100485 entitled "Apparatus for Reducing Running Noise in Disk Drive", filed on Jan. 15, 2002.

FIELD OF INVENTION

The present invention relates to noise reduction and, more particularly, to reduce running noise in a disk drive.

BACKGROUND OF THE INVENTION

As technologies progress, drive speed of a disk drive increases. The speed of a disk drive can be high up to 50×. That is a standard peripheral to a computer today. However, when drive speed of a disk drive is higher, running noise of a running disk drive also increases. For example, airflow is generated while a disk is rotating in the disk drive. Subsequently, noise is produced because of friction between airflow and components. Noise is even louder while airflow flows over a non-continuous surface and results in turbulence. Accordingly, solutions for reducing noise include guiding airflow to prevent turbulence. Another solution is absorbing noise by a noise absorbent.

FIG. 1 and FIG. 2A are diagrams of a conventional disk drive. Disk tray 2 is used for supporting disk 1, and hooks 21 are used for preventing disk 1 from leaving the receiving space. Disk tray 2 has disk 1 thereon and is driven into housing 5 to proceed with actions such as the disk reading and writing.

Referring to FIG. 2A, disk tray 2 has a plurality of hooks 21. Disk tray 2 is made by an injection modeling process, and through-hole 22 must be formed under each hook 21. FIG. 2B is a diagram showing the bottom part of disk tray 2. FIG. 2C is an enlarged diagram showing the encircled region A in FIG. 2B. It is clear in FIG. 2C that each through-hole 22 is a hole located on disk tray 2. Consequently, a non-continuous surface is formed by disk tray 2 with through-holes 22, and the non-continuous surface becomes a noise source.

SUMMARY OF THE INVENTION

One aspect of the present invention is to reduce running noise in a disk drive.

When a disk drive is running, airflow is generated in the disk drive. For guiding airflow, a hole is located on a front-end of the disk tray. The first noise absorbent is disposed above the hole and between the disk tray and a housing. The airflow is guided through the hole to contact the first noise absorbent, and the running noise is absorbed by the first noise absorbent. Therefore, noise is reduced to a lower level.

Another noise source is that the disk tray has a non-continuous surface because of through-holes located thereon. In the present invention, the disk tray has a wall located at the rim of each through-hole. When airflow flows through each through-hole, the running noise is reduced by the wall. In another embodiment of the present invention, the second noise absorbent is disposed on a joining portion of a cover and a panel. Since a user is in front of the disk drive while operating it, noise is absorbed by the second noise absorbent before being heard by the user. In this manner, noise can be reduced to a lower level.

DETAILED DESCRIPTION

Figure 1:
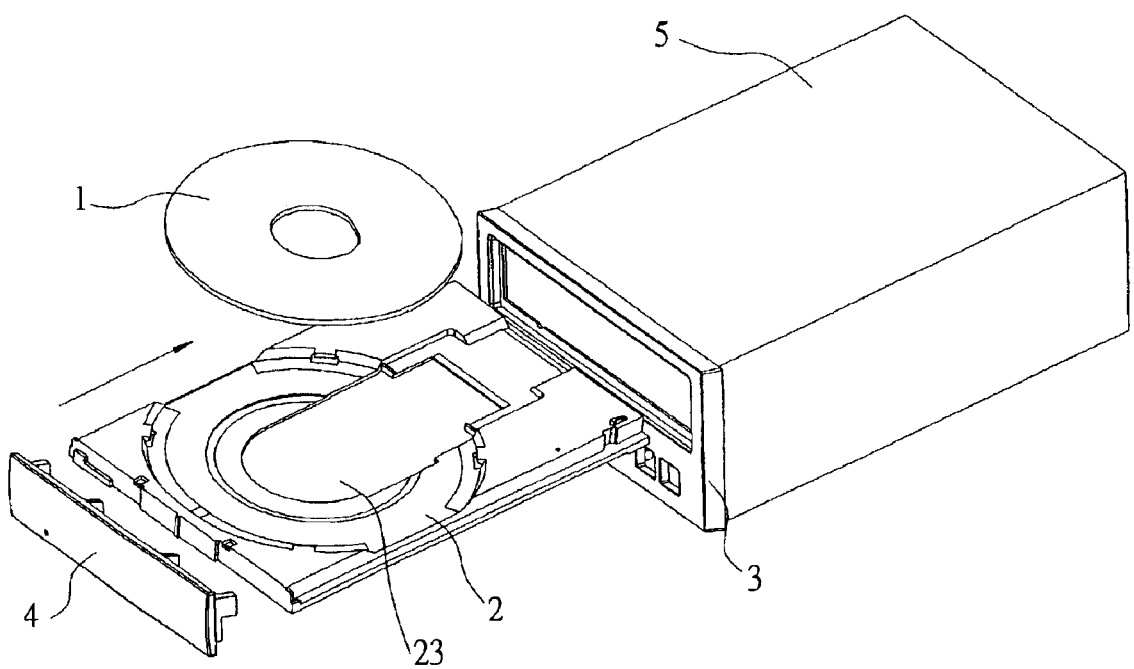
FIG. 1 is a diagram showing a conventional disk drive.
Figure 2A:
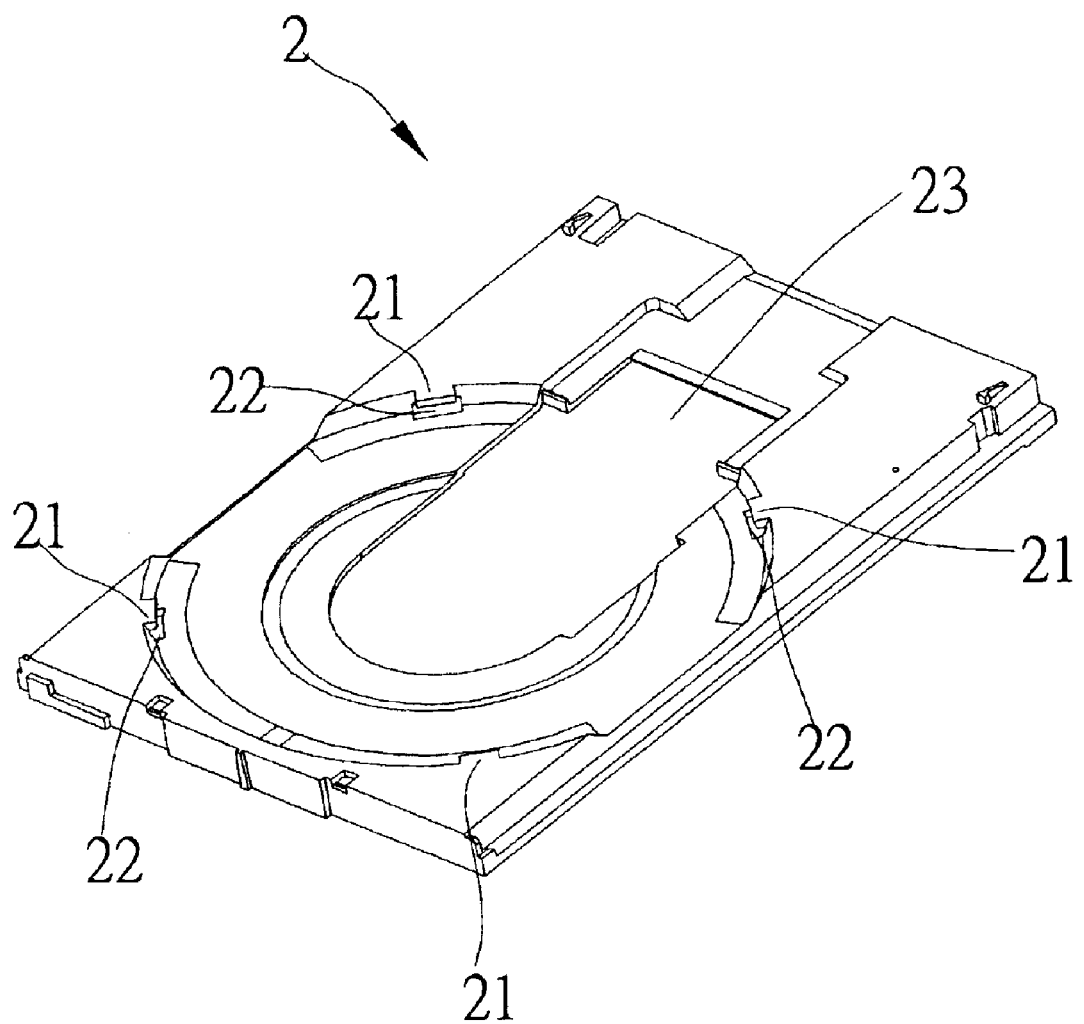
FIG. 2A is a diagram of a conventional disk tray.
Figure 2B:
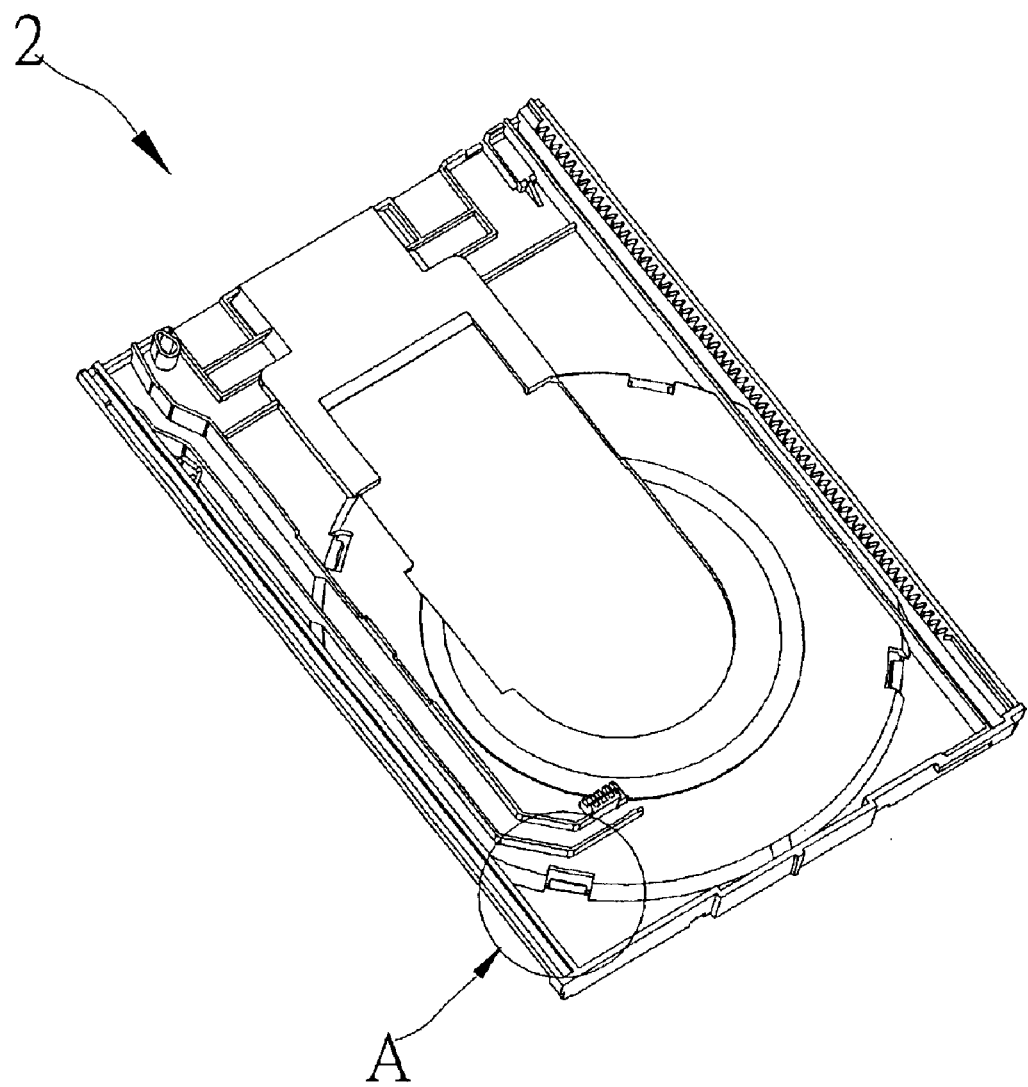
FIG. 2B is a diagram of a conventional disk tray with its bottom part facing toward a viewer.
Figure 2C:
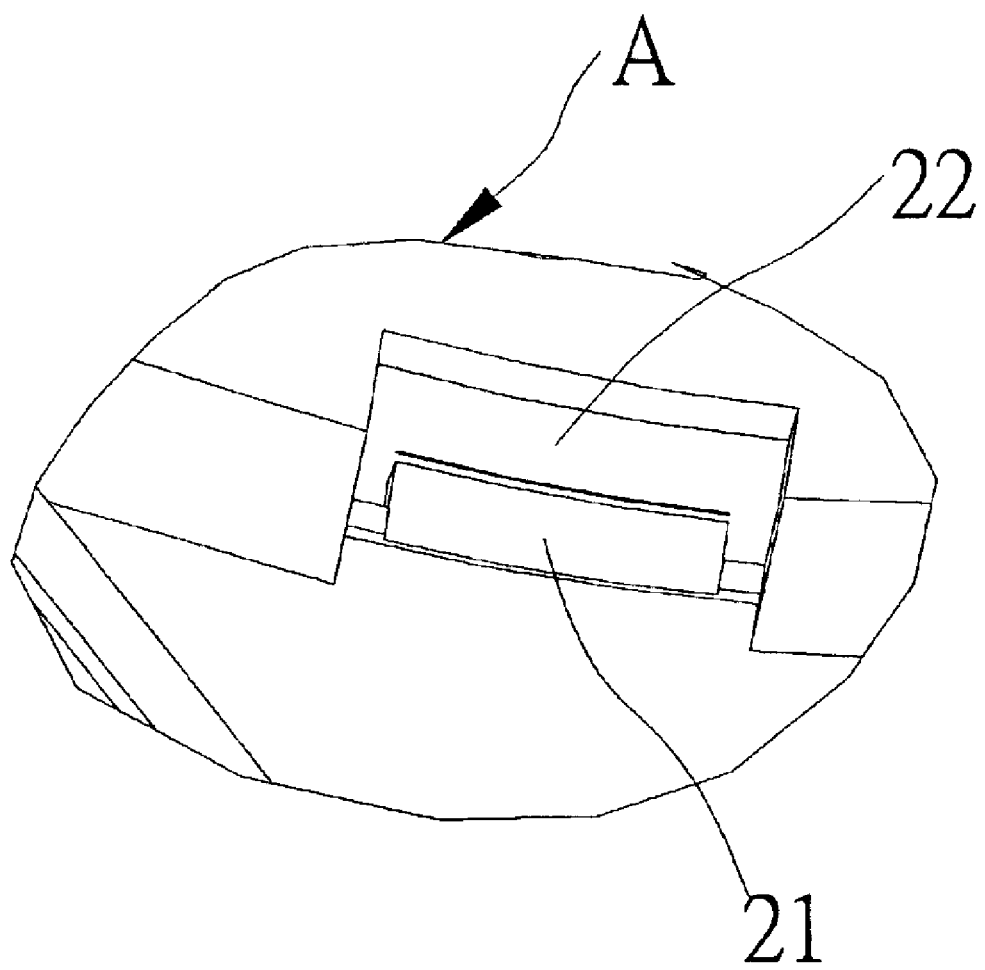
FIG. 2C is an enlarged diagram of the disk tray in FIG. 2B showing that a through-hole is located on the disk tray.
Figure 3:
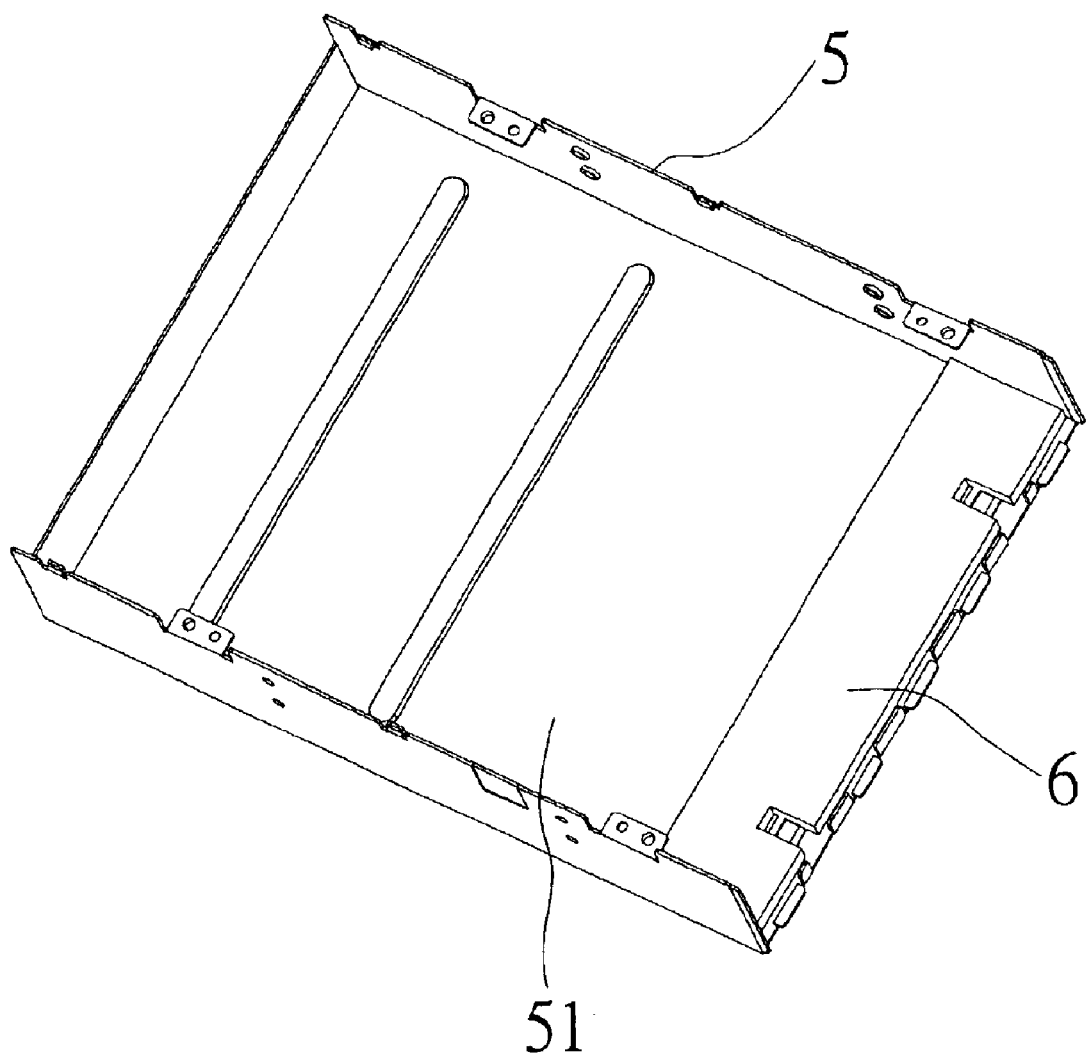
FIG. 3 is an exemplary embodiment of first noise absorbent 6 and housing 5 with its inner structure facing toward a viewer.

For reducing running noise in a disk drive, the present invention provides several embodiments in conjunction with the accompanying drawings. FIG. 3 to FIG. 5 are diagrams showing the components in the disk drive for illustrating embodiments of the present invention.

FIG. 3 is a diagram showing housing 5 and first noise absorbent 6. Inner space 51 accommodates disk tray 2. First noise absorbent 6 is disposed in an inner part of housing 5 and the inlet of inner space 51. First noise absorbent 6 is used for absorbing noise generated due to airflow. The first noise absorbent 6 may be a sponge, a cloth made by fiber, or the like. The location of first noise absorbent 6 is decided by the specific demand. In the present invention, as a user operates the disk drive in front of it, the location of first noise absorbent 6 is near the front side of the disk drive. First noise absorbent 6 is adhered on an inner part of housing 5 and near the exit to disk tray 2, or is adhered on a front side of disk tray 2. Thus, noise is absorbed by first noise absorbent 6 and is reduced to a lower level.

Figure 4A:
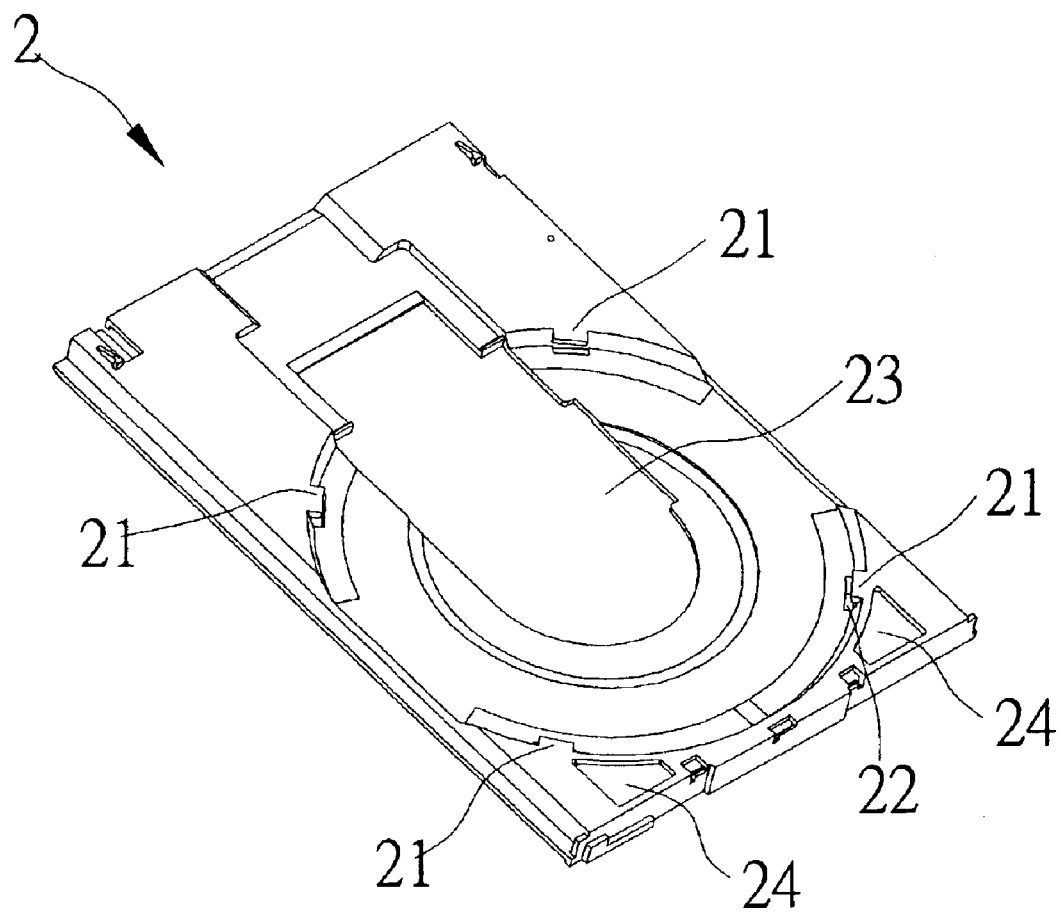
FIG. 4A is a diagram showing a disk tray in accordance with an exemplary embodiment of the present invention.
Figure 5:
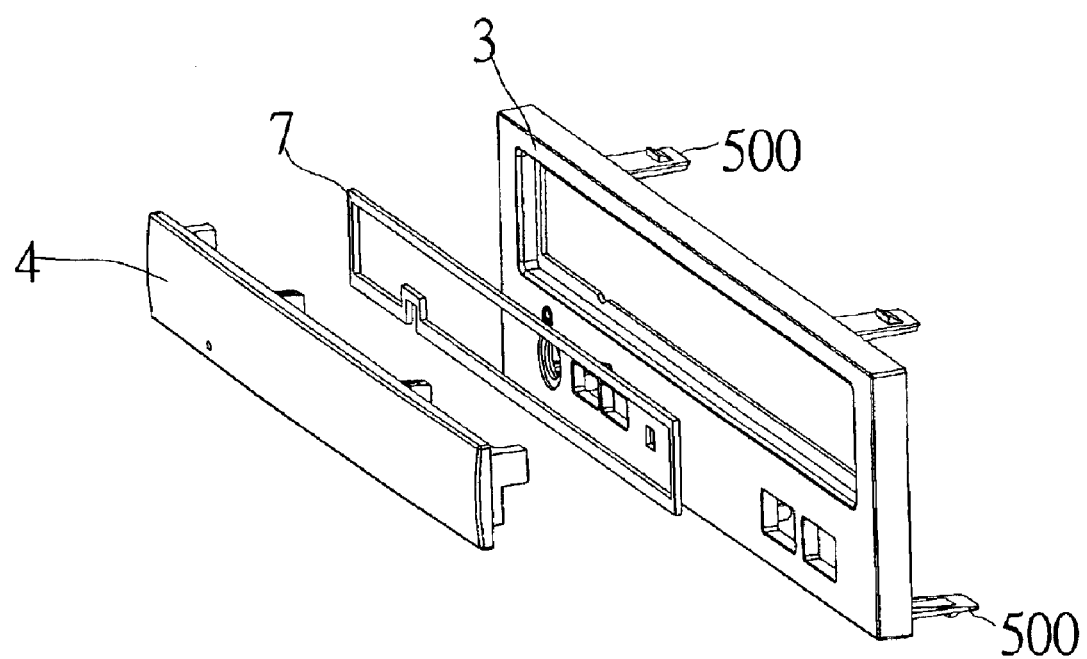
FIG. 5 is another exemplary embodiment of the present invention.

Referring to FIG. 4A, disk tray 2 is used for supporting a disk thereon. Hole 24 located on disk tray 2 allows airflow passing through hole 24. The position of hole 24 is decided by the specific demand. In the present invention, as the user utilizes the disk drive in the front side of it, hole 24 is preferably located on the front-end of disk tray 2.

Referring to FIG. 3 and FIG. 4A, the combination of hole 24 and first noise absorbent 6 as described above reduces noise substantially to a lower level. Shape and number of hole 24 are decided by the specific demand. For example, FIG. 4A shows an exemplary embodiment in which two holes 24 are located in the front-end of disk tray 2.

Figure 4B:
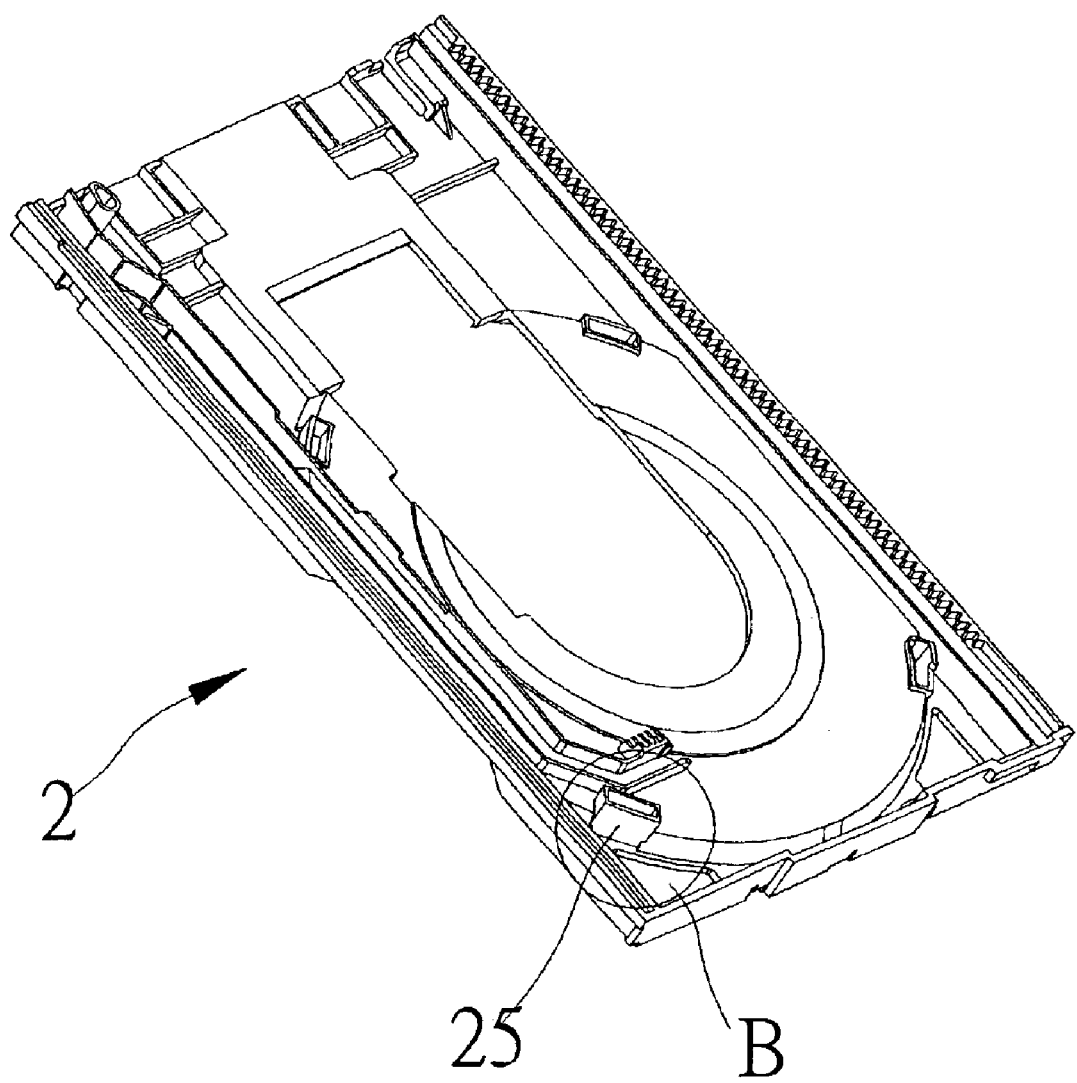
FIG. 4B is a diagram of a disk tray with its bottom part facing toward a viewer in accordance with an exemplary embodiment of the present invention.
Figure 4C:
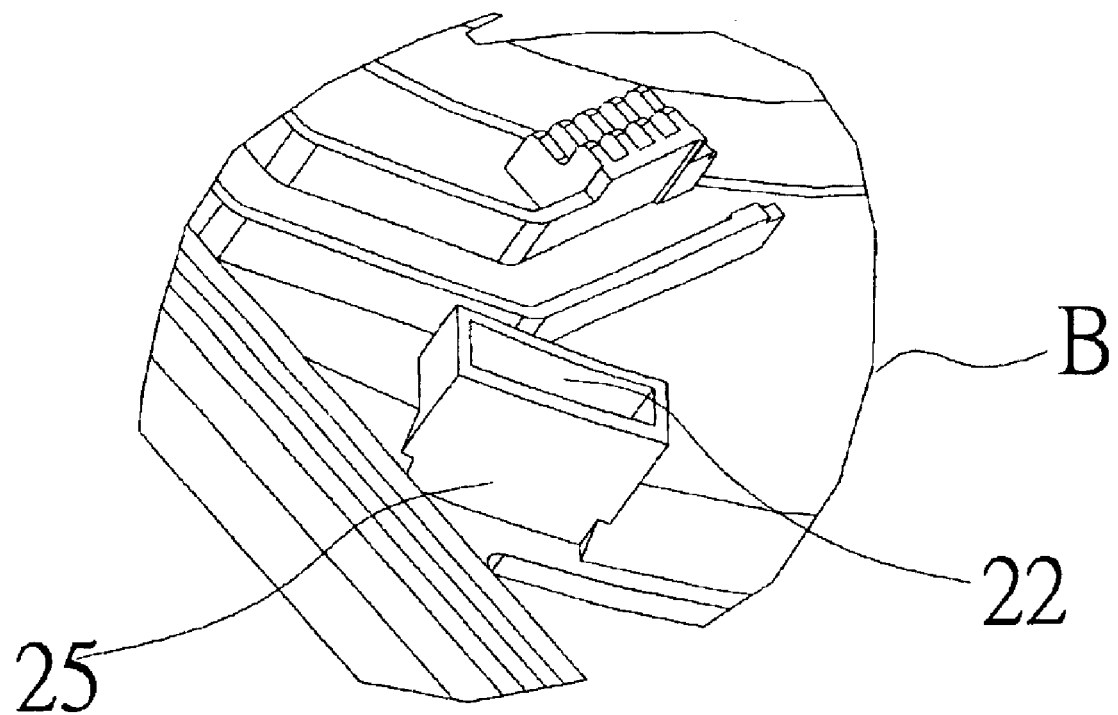
FIG. 4C is an enlarged diagram of the disk tray in FIG. 4B showing that a through-hole is located on the disk tray.

As shown in FIG. 4A, a plurality of hooks 21 are provided on the disk tray 2 for preventing the disk from leaving the receiving space. When hooks 21 are made by the injection modeling process, through-hole 22 is created under each hook 21. Through-holes 22 result in a non-continuous surface on disk tray 2, and the non-continuous surface becomes a source of noise while airflow passing it. For reducing this noise, the present invention provides an exemplary embodiment as shown in FIG. 4B and FIG. 4C. Each through-hole 22 defines a rim, and this embodiment provides wall 25 along the rim of through-hole 22. Wall 25 and hook 21 are in opposite sides of the disk tray 2. As wall 25 guides the airflow into the through-hole 22, noise is reduced to a lower level. Although the higher wall has better noise reduction benefit, the usable space in the disk drive should be considered while determining the height of wall 25.

As shown in FIG. 5, panel 3 engages with housing 5 using hooks 500. Cover 4 is movably connected to panel 3. Second noise absorbent 7, which is preferably a closed-loop sponge, is located between connection of cover 4 and panel 3. In this manner, noise leaking from an interstice between connection of panel 3 and cover 4 is reduced to a lower level.

There are several exemplary embodiments for reducing running noise in a disk drive mentioned above. If all embodiments apply to one disk drive at the same time, running noise could be certainly reduced to a lower level. Alternatively, different combinations of exemplary embodiments applying to one disk drive also partially reduce noise.

While this invention has been described with reference to several illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as falling within the true scope of the invention.

We claim:

1. An apparatus for reducing a running noise in a disk drive, the disk drive comprising a disk tray and a housing, an inner part of the housing accommodating the disk tray, the disk tray comprising a front end and a central recession for supporting a disk when the disk drive is running and the disk is rotating, an airflow is generated in the disk drive, the apparatus comprising:

at least one hole located on the front-end of the disk tray; and a first noise absorbent, corresponding to the at least one hole, disposed on the inner part of the housing;

wherein the airflow is guided through the hole such that the running noise is absorbed by the first noise absorbent.

2. The apparatus according to claim 1, the disk tray further comprising a plurality of through-holes, each through-hole define a rim, the disk tray having a wall located at the rim and the wall downwardly extended from the rim under the disk tray, when the airflow flows through each through-hole, the running noise is reduced by the wall.

3. The apparatus according to the claim 1, wherein the first noise absorbent is a sponge.

4. The apparatus according to the claim 1, wherein the first noise absorbent is adhered on the inner part of the housing.

5. The apparatus according to claim 4, wherein the first noise absorbent is adhered on a position near an exit of the disk tray.

6. The apparatus according to claim 1, the disk drive further comprising a cover, a panel and a second noise absorbent, the second noise absorbent being disposed on a joining portion of the cover and the panel.

7. The apparatus according to claim 6, wherein the second noise absorbent is a sponge.

8. A disk drive with a function for reducing a running noise, the disk drive comprising:

a disk tray for supporting a disk, the disk tray having a through-hole, the through-hole defining a rim; and a wall, the wall located at the rim of the through-hole and the wall downwardly extended from the rim under the disk tray;

when the disk drive is running and the disk is rotating, an airflow is generated in the housing and the running noise is produced, the wall restricting a direction of the airflow while the airflow flows through the through-hole, such that the running noise is reduced to a lower level by a first noise absorbent.

9. The disk drive according to the claim 8, wherein the first noise absorbent is a sponge.

10. The disk drive according to the claim 8, wherein the first noise absorbent is adhered on the inner part of the housing.

11. The disk drive according to claim 8, wherein the first noise absorbent is adhered on a position near an exit of the disk tray.

12. The disk drive according to claim 8, the disk drive further comprising a cover, a panel and a second noise absorbent, the second noise absorbent being disposed on a joining portion of the cover and the panel.

* * * * *